United States Patent [19]
Tomita

[11] Patent Number: 5,871,598
[45] Date of Patent: Feb. 16, 1999

[54] PNEUMATIC TIRE INCLUDING BLOCK HAVING SIPE

[75] Inventor: Arata Tomita, Kunitachi, Japan

[73] Assignee: Bridgestone Corporation, Tokyo, Japan

[21] Appl. No.: 837,454

[22] Filed: Apr. 18, 1997

[30] Foreign Application Priority Data

Apr. 19, 1996 [JP] Japan .................................... 8-098921
Feb. 6, 1997 [JP] Japan .................................... 9-023615

[51] Int. Cl.⁶ ............................ B60C 11/11; B60C 11/12
[52] U.S. Cl. .................................. 152/209 R; 152/DIG. 3
[58] Field of Search .......................... 152/209 R, 209 D, 152/DIG. 3

[56] References Cited

FOREIGN PATENT DOCUMENTS

| 654366 | 5/1995 | European Pat. Off. ............ 152/209 R |
| 59-209903 | 11/1984 | Japan ............................... 152/DIG. 3 |
| 1-132406 | 5/1989 | Japan . | |
| 2-60806 | 3/1990 | Japan ............................... 152/290 D |
| 3-14704 | 1/1991 | Japan ............................... 152/209 R |
| 7-81328 | 3/1995 | Japan . | |
| WO 92/05969 | 4/1994 | WIPO . | |

OTHER PUBLICATIONS

Patent Abstracts of Japan, vol. 11, No. 158 (M–591), May 22, 1987 (JP 61 291205).
Patent Abstracts of Japan, vol. 13, No. 380 (M–863) Aug. 23, 1989 (JP 01 132406).
Patent Abstracts of Japan, vol. 95, No. 005, Jun. 30, 1995 (JP 07 040711).

European Search Report dated Jul. 28, 1997.

*Primary Examiner*—Steven D. Maki
*Attorney, Agent, or Firm*—Sughrue, Mion, Zinn, Macpeak & Seas, PLLC

[57] ABSTRACT

A pneumatic tire having a tread provided with at least one circumferential groove extending substantially parallel with the tire circumferential direction, and inclined grooves arranged at intervals in the circumferential direction of the tire, the inclined grooves being inclined at an angle with respect to the circumferential groove and the axial direction, and blocks formed by the circumferential groove and the inclined grooves and arranged at intervals in the circumferential direction of the tire, the blocks having acute angle corners formed by the circumferential groove and the respective inclined grooves, wherein (a) a sipe is formed near one of the acute angle corners which contacts the ground later in the block during tire rotating, the sipe having an opening at the circumferential groove or at a tread end, and (b) the sipe extends from the opening toward the inside of the block substantially parallel with the inclined groove and terminates in the block. It is thus possible to restrain uneven wear without degrading steering stability in a tire with a pattern of blocks having acute angle corners.

4 Claims, 2 Drawing Sheets

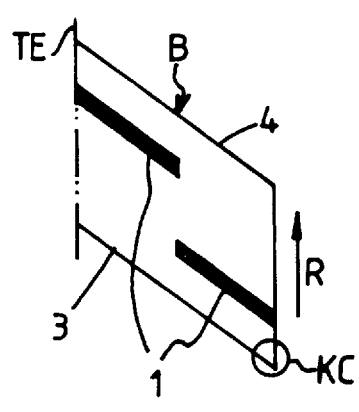
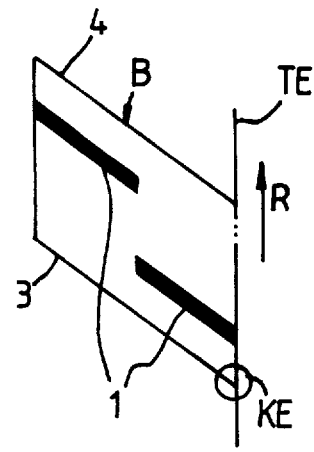
FIG. 1(a)  FIG. 1(b)
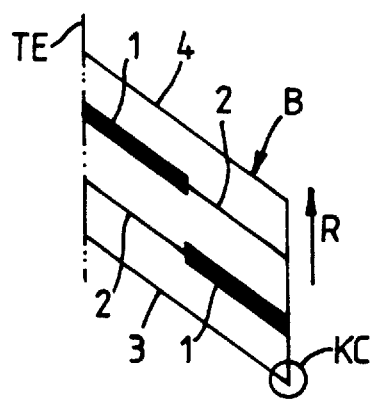
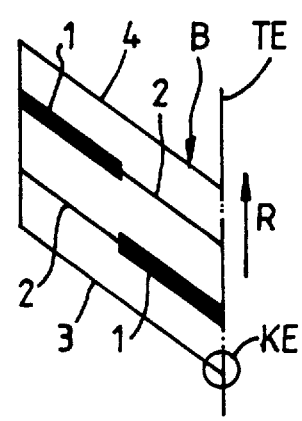
FIG. 2(a)  FIG. 2(b)

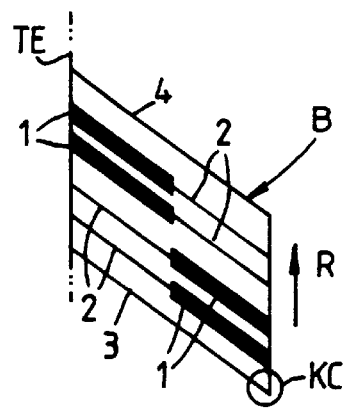
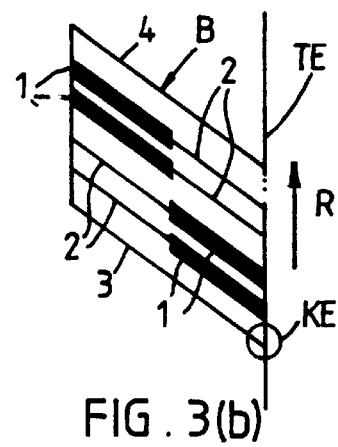
FIG. 3(a)    FIG. 3(b)
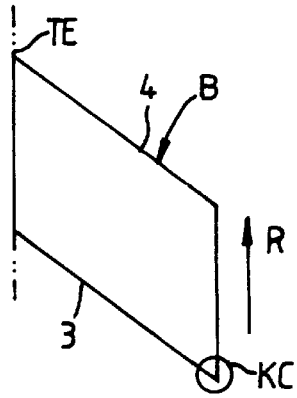
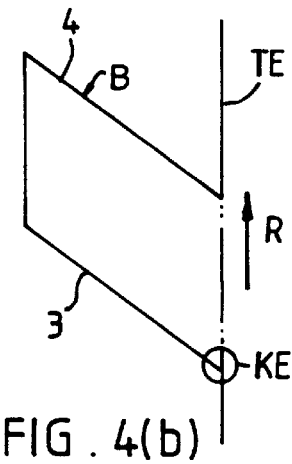
FIG. 4(a)    FIG. 4(b)
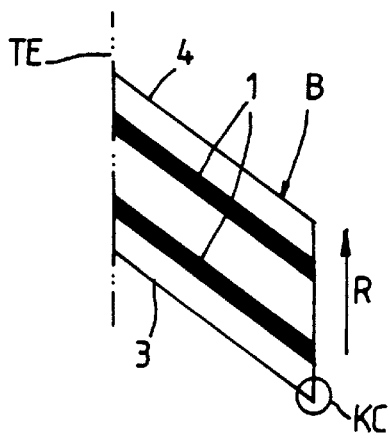
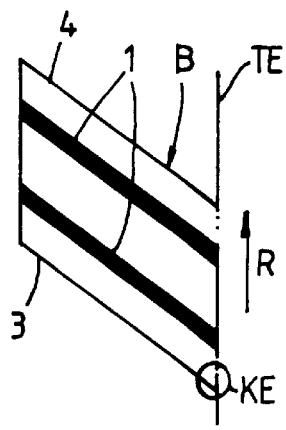
FIG. 5(a)    FIG. 5(b)

PNEUMATIC TIRE INCLUDING BLOCK HAVING SIPE

BACKGROUND OF THE INVENTION

1. Field of the Invention

This invention relates to a pneumatic tire, and is concerned with restraint of uneven wear of a pneumatic tire, in particular restraint of uneven wear of a pneumatic tire of a block pattern provided with blocks having acute angle corners.

2. Description of the Prior Art

Because of problems in relation to steering stability, appearance, drainage and noise, lateral grooves in block-type tread patterns adopted on normal passenger tires are mostly arranged not to be parallel with the axial direction of the tire and the blocks are shaped as parallelograms. Further many ordinary or all-weather tires are provided with sipes (or fine grooves) substantially parallel with the axis of the tire to obtain steering stability on a wet road. However, such sipes made rigidity distribution of the blocks unbalanced, so that the blocks were distorted in the ground contact area and uneven wear was produced.

On the other hand, in the case where the sipes (or fine grooves) are arranged parallel with the lateral grooves, the rigidity of the blocks as a whole was lowered and steering stability was degraded. Therefore, means such as making the lateral grooves or sipes shallow was used. However, the above mentioned shallowing of the grooves or the sipes caused poor drainage and bad appearance at the terminal stage of use of the tire.

An object of the present invention is to overcome the above mentioned disadvantages of the prior art, and provide a pneumatic tire which restrains uneven wear without degrading drainage and appearance at the terminal stage of use of the tire.

SUMMARY OF THE INVENTION

The present invention provides a pneumatic tire having a tread provided with at least one circumferential groove extending substantially parallel with the tire circumferential direction, and inclined grooves arranged at intervals in the circumferential direction of the tire, the inclined grooves being inclined at an angle with respect to the circumferential groove and the axial direction, and blocks formed by the circumferential groove and the inclined grooves and arranged at intervals in the circumferential direction of the tire, the blocks having acute angle corners formed by the circumferential groove and the respective inclined grooves, characterized in that a) a sipe is formed near one of the acute angle comers which contacts the ground later in the block during tire rotating, the sipe having an opening at the circumferential groove or at a tread end, and b) the sipe extends from the said opening toward the inside of the block substantially in parallel with the inclined groove and terminates in the block.

Here, the tread end means the end of the ground contact area of the tread in the width direction.

It is preferable, for further attaining the object of the present invention, that a auxiliary sipe having shallower depth than the sipe is formed to connect with the sipe, and the auxiliary sipe extends substantially in parallel with the inclined groove and reaches an opposite block edge. That is, the auxiliary sipe preferably opens to another circumferential groove or a tread end which is located on the opposite side of the circumferential groove to which the sipe opens.

Further, it is preferable that the length of sipe is 30–70% of a distance from the opening to the opposite block edge through the terminal end of the sipe.

It is also preferable that the sipe is arranged apart from the nearest inclined groove by 2 mm or more and not more than 30% of the circumferential length of the block when measured in a direction perpendicular to the nearest inclined groove.

Furthermore, it is preferable that the depth of the auxiliary sipe is 20–70% of that of the sipe. The invention provides a pneumatic tire comprising a tread provided with at least one circumferential groove extending substantially parallel with the tire circumferential direction, and inclined grooves arranged at intervals in the circumferential direction of the tire, the inclined grooves being inclined at an angle with respect to the circumferential groove and the axial direction, and blocks formed by the circumferential groove, a tread end and the inclined grooves and arranged at intervals in the circumferential direction of the tire, the blocks having acute angle corners formed by the circumferential groove and the respective inclined grooves, wherein (a) a sipe is formed near one of the acute angle corners of the blocks which during rotation of the tire contacts the ground later than a corner of the block which is circumferentially spaced from the acute angle corner of the block, the sipe having an opening at the circumferential groove or at the tread end, wherein the block includes a first region and a second region, each of the first region and the second region being apart from the nearest inclined groove by 2 mm or more and not more than 30% of the circumferential length of the block when measured in a direction perpendicular to the nearest inclined groove, there being no sipes in the block between the first region and the second region, and (b) the sipe extends from the opening toward the inside of the block substantially parallel with the inclined groove and terminates in the block, and wherein the sipe is arranged only in the first region of the block so that during rotation of the tire a portion of the block defined by the one of the acute angled corners moves so as to be separated from the block and tension in the portion of the block caused by a remaining portion of the block which has left the ground contact area is reduced.

BRIEF DESCRIPTION OF THE DRAWINGS

FIG. 1(*a*) and FIG. 1(*b*) each is an enlarged view of a portion of a tread pattern of a first embodiment of a tire according to the invention;

FIG. 2(*a*) and FIG. 2(*b*) each is an enlarged view of a portion of a tread pattern of a second embodiment of a tire according to the invention;

FIG. 3(*a*) and FIG. 3(*b*) each is an enlarged view of a portion of a tread pattern of a third embodiment of a tire according to the invention;

FIG. 4(*a*) and FIG. 4(*b*) each is an enlarged view of a portion of a tread pattern of a first comparative example of a tire; and FIG. 5(*a*) and FIG. 5(*b*) each is an enlarged view of a portion of a tread pattern of a second comparative example of a tire.

DESCRIPTION OF THE PREFERRED EMBODIMENTS

In each of FIGS. 1 to 5, the drawing (a) shows a block B wherein the tread edge TE is located at the left-hand side as shown, and the drawing (b) shows a block B wherein the tread edge TE is located at the right-hand side as shown. The reference letter R indicates the direction of rotation of the tire, while the reference numerals 4 and 3 respectively indicate the stepping-in end and the stepping-out end of the block when the block contacts the ground during the tire rotation. The reference letters KC and KE indicate acute angle corners of the block at the stepping-out end where uneven wear occurs; KC indicates wear adjacent a circumferential groove in each of the drawings (a), and KE indicates wear adjacent a tread end in each of the drawings (b).

In FIGS. 1(a) and 1(b), which illustrate a first embodiment of a tire according to the invention, sipes 1 extend respectively from a tread end side and from a circumferential groove side of the block and terminate in the block, as shown.

In FIGS. 2(a) and 2(b), which illustrate a second embodiment of a tire according to the invention, sipes 1 are provided in a similar manner to the sipes in FIG. 1, and in addition auxiliary sipes 2 having shallower depth than the sipes 1 are formed to connect with the sipes 1 and extend to the respective opposite block edge.

In FIGS. 3(a) and 3(b), which illustrate a third embodiment of a tire according to the invention, sipes 1 and auxiliary sipes 2 are provided in a similar manner as in FIG. 2, except than in FIG. 3 pairs of sipes 1 and pairs of auxiliary sipes 2 are provided, as shown.

In FIGS. 4(a) and 4(b), which illustrate a tire of a first comparative example, no sipes are provided in the blocks B.

In FIGS. 5(a) and 5(b), which illustrate a tire of a second comparative example, sipes 1 are provided in each block B, as shown, but in this case the respective sipes extend continuously from the tread end to the circumferential groove across the whole length of the block.

In each of FIGS. 1 to 3, there are shown both a sipe opening to the circumferential groove and a sipe opening to the tread end in the block; however, there may be formed only sipes which open to the circumferential groove or there may be formed only sipes which open to the tread end.

In the block-type tread pattern, uneven wear occurs at a stepping-out end of the block. This "stepping-out end of the block" means a block end which contacts the ground later between block ends in the block during tire rotating, when viewing one block among many blocks formed by circumferential grooves and inclined grooves and arranged in the circumferential direction at intervals. This uneven wear particularly occurs at the stepping-out end KC, KE near the block corner where, as shown in FIG. 4, the circumferential groove or the tread end crosses the inclined groove at an acute angle.

By observing the movement of the block in detail, the present inventor obtained knowledge as follows:

1) Since the circumferential groove or the tread end crosses the inclined groove at an acute angle, the stepping-out end KC, KE is weak in rigidity and suffers large transformation.

2) The stepping-out end KC, KE leaves the ground contact area last when the block leaves the ground contact area. The stepping-out end, in addition, is weakest in rigidity in the block. Therefore, difference of transformation amount between the portion KC, KE and a remaining portion which has left the ground is so large that this portion suffers tension. Consequently, the stepping-out end KC, KE twists and moves considerably and as a result the wear volume of this portion increases notably.

3) When side force is also applied, the twist operating on the portion KC, KE further increases so that uneven wear is accelerated.

4) In the case, as shown in FIG. 5, where a sipe is formed near this portion KC, KE in parallel with the inclined groove, the portion KC, KE moves so as to be separated from the block and tension caused by the remaining portion which has left the ground contact area can be cut. Further, compression rigidity is lowered and the ground contact pressure is reduced. As a result, the wear becomes small. However, if, as in FIG. 5, the sipe does not terminate in the block and opens to the circumferential groove or tread end, the rigidity of the block as a whole becomes too small and easy to move, and therefore steering stability becomes degraded.

5) By forming the sipe, and optionally also an auxiliary sipe, in accordance with the present invention and as shown in each of FIGS. 1, 2 and 3, the portion KC, KE moves so as to be separated from the block, and as a result wear at the portion KC, KE can be reduced without lowering rigidity as a whole.

The length of the sipe is preferably set at 30–70% of the distance from the opening to the opposite block edge through the terminal end of the sipe. This is because, if the length of the sipe is less than 30%, the effect to separate the portion KC, KE from the block is small and wear may not be sufficiently reduced, and if the length of the sipe is more than 70%, the rigidity of the whole block becomes small and steering stability is degraded.

The sipe is preferably arranged apart from the nearest inclined groove by 2 mm or more and not more than 30% of the circumferential length of the block when measured in a direction at a right angle to the nearest inclined groove. This is because, if said distance is less than 2 mm, the rigidity of the block end portion is lowered, and if said distance is more than 30%, the rigidity is too high, and in both cases the effect provided by the sipe may not be sufficient.

Further, the depth of the auxiliary sipe, where provided, is preferably set at 20–70% of that of the sipe. This is because, if the depth of the auxiliary sipe is less than 20% of that of the sipe, the auxiliary sipe may disappear at a relatively early stage of use, and if the depth of the auxiliary sipe is more than 70% of that of the sipe, the rigidity as a whole becomes small and the steering stability is degraded.

In this invention, the sipe and the auxiliary sipe can be added near the acute angle corner of the step-in end, which enters the ground contact area earlier.

There are described below embodiments of the invention using tires having a size of 185/70R14. The tires of the present invention and of comparative examples are each provided with a large number of blocks having a shape as shown in FIGS. 1 to 5 near the tread end portion in the circumferential direction of the tires. The inclined grooves which partially define the blocks extend at an angle of 30° with respect to the circumferential direction. The depth of each of the inclined grooves and the circumferential grooves is 8 mm. The circumferential length of the blocks is about 31 mm, and the length of the blocks in the width direction is 36 mm. Because the blocks near the tread end portion suffer larger volume of wear (uneven wear) than those at the center portion of the tire and largely contribute to steering stability, tests were carried out with respect to the blocks at the tread end portion.

FIG. 4 shows a block of comparative example 1 provided with no sipes. FIG. 5 shows a block of comparative example 2 provided with sipes 1 which have a width of 0.7 mm and depth of 6 mm and extend parallel with a inclined groove continuously from the tread end to a circumferential groove. Specification of the sipes of examples 1–20 and comparative examples are described in Table 1 below. In order to examine the effect of the present invention, twenty-two test tires were prepared based on the tires of the examples and the comparative examples, and comparative tests were carried out in relation to uneven wear and steering property. The tires of the examples and the comparative example 2 have the same construction as the tire of the comparative example 1 except for having sipes as described in Table 1.

In the uneven wear test, each tire was mounted on a rim having a size of 5½J with inflation pressure of 1.9 kgf/cm$^2$, and the test was carried out by using a flat-belt wear test machine having a cloth file on it. The tire was run according to the following conditions-room temperature: 30° C.; load: 450 kgf; slip angle: 0.40°; braking force: 45 kgf; speed: 50 km/h; and mileage: 200 km. Step distance of wear, which is defined as normal distance between a worn surface at the block end KC, KE and the surface of the remaining portion of the block, was evaluated by using comparative example 1 as a control having an index value of 100. The results obtained are shown in Table 1 below. The smaller the value, the better the result.

In the steering property test, each tire was mounted on a rim having a size of 5½J with inflation pressure of 1.9 kgf/cm$^2$, and cornering power (CP) was measured by using a flat-belt test machine with load of 50 kgf. Cornering power here means cornering force per slip angle of 1°. In this test, average value of cornering power when slip angle varies from 0° to 7° is indicated by using comparative example 1 as a control having an index value of 100. The results obtained are also shown in Table 1. The larger the value, the larger is the cornering power and the better is the steering property.

2. Sipe depth is indicated by percentage with respect to the depth of the circumferential groove.
3. Sipe position is indicated by distance from the adjacent inclined groove in the direction perpendicular to the groove.
4. Auxiliary groove depth is indicated by percentage with respect to the sipe depth.

As indicated above, the tires according to the invention improve uneven wear in comparison with the tire of comparative example 1. In addition, cornering power is improved in comparison with the tire of comparative example 2, and it is more preferable that the value of cornering power (CP) is not less than about 85% of the value of the comparative example 1.

While the invention has been described above with particular reference to blocks B adjacent a tread end TE, it will be understood that the invention is equally applicable to blocks which are not adjacent a tread end, but are instead defined between two circumferential grooves.

The present invention thus provides a pneumatic tire which restrains uneven wear at the shoulder portion without degrading steering property.

While the invention has been particularly shown and described with reference to certain preferred embodiments thereof, it will be understood by those skilled in the art that various changes and modifications may be made within the spirit and scope of the invention.

I claim:

1. A pneumatic tire comprising a tread provided with at least one circumferential groove extending substantially parallel with the tire circumferential direction, and inclined grooves arranged at intervals in the circumferential direction of the tire, the inclined grooves being inclined at an angle with respect to the circumferential groove and the axial

|  | Sipe length | Sipe depth | Sipe position | Auxiliary sipe depth | Uneven wear (a) KC | Uneven wear (b) KE | CP |
|---|---|---|---|---|---|---|---|
| Comp. Example 1 (FIG. 4) | — | — | — | — | 100 | 100 | 100 |
| Comp. Example 2 (FIG. 5) | 100% | 70% | 5 mm | — | 98 | 97 | 82 |
| Example 1 (FIG. 2) | 30 | 50 | 5 | 50% | 91 | 94 | 94 |
| Example 2 (FIG. 2) | 50 | 50 | 5 | 50 | 85 | 90 | 90 |
| Example 3 (FIG. 2) | 70 | 50 | 5 | 50 | 82 | 88 | 87 |
| Example 4 (FIG. 2) | 50 | 20 | 5 | 50 | 95 | 98 | 97 |
| Example 5 (FIG. 2) | 50 | 70 | 5 | 50 | 81 | 84 | 87 |
| Example 6 (FIG. 2) | 20 | 50 | 5 | 50 | 95 | 98 | 96 |
| Example 7 (FIG. 2) | 80 | 50 | 5 | 50 | 80 | 86 | 84 |
| Exampie 8 (FIG. 2) | 50 | 10 | 5 | 50 | 97 | 100 | 99 |
| Example 9 (FIG. 2) | 50 | 80 | 5 | 50 | 82 | 85 | 84 |
| Example 10 (FIG. 2) | 50 | 50 | 5 | 20 | 88 | 93 | 94 |
| Example 11 (FIG. 2) | 50 | 50 | 5 | 70 | 82 | 87 | 88 |
| Example 12 (FIG. 2) | 50 | 50 | 2 | 70 | 85 | 89 | 85 |
| Example 13 (FIG. 2) | 50 | 50 | 9 | 70 | 87 | 93 | 87 |
| Example 14 (FIG. 2) | 50 | 50 | 9 | 10 | 92 | 97 | 95 |
| Example 15 (FIG. 2) | 50 | 50 | 9 | 80 | 90 | 93 | 84 |
| Example 16 (FIG. 2) | 50 | 50 | 1.5 | 80 | 88 | 93 | 83 |
| Example 17 (FIG. 2) | 50 | 50 | 12 | 80 | 91 | 96 | 84 |
| Example 18 (FIG. 1) | 50 | 50 | 5 | — | 92 | 95 | 96 |
| Example 19 (FIG. 3) | 30 | 50 | 5 mm/ 9 mm | 50 | 84 | 88 | 87 |
| Example 20 (FIG. 3) | 30 | 50 | 5 mm/ 1 mm | 50 | 84 | 89 | 84 |

1. Sipe length is indicated by percentage with respect to the distance from the opening to the opposite edge through the terminal end of the sipe.

direction, and blocks formed by the circumferential grooves, a tread end and the inclined grooves and arranged at intervals in the circumferential direction of the tire, the blocks having acute angle corners formed by the circumferential groove and the respective inclined grooves, wherein (a) a sipe is formed near one of the acute angle corners of the blocks which during rotation of the tire contacts the ground later than a corner of the block which is circumferentially spaced from said acute angle corner of the block, the sipe having an opening at the circumferential groove or at the tread end, wherein the block includes a first region and a second region, each of said first region and said second region being apart from the nearest inclined groove by 2 mm or more and not more than 30% of the circumferential length of the block when measured in a direction perpendicular to the nearest inclined groove, there being no sipes in said block between said first region and said second region, and (b) the sipe extends from said opening toward the inside of the block substantially parallel with the inclined groove and terminates in the block, and wherein the sipe is arranged only in said first region of said block so that during rotation of the tire a portion of the block defined by said one of the acute angle corners moves so as to be separated from the block and tension in said portion of the block caused by a remaining portion of the block which has left the around contact area is reduced.

2. The pneumatic tire according to claim 1, wherein the length of the sipe is 30–70% of a distance from said opening to the opposite block edge through the terminal end of the sipe.

3. The pneumatic tire according to claim 1, further comprising an auxiliary sipe having shallower depth than the sipe which terminates in the block and formed to connect with the sipe, the auxiliary sipe extending substantially in parallel with the inclined groove and reaching an opposite block edge.

4. The pneumatic tire according to claim 3, wherein the depth of the auxiliary sipe is 20–70% of that of the sipe which terminates in the block.

* * * * *